(12) United States Patent
Naoi (10) Patent No.: US 7,458,704 B2
(45) Date of Patent: Dec. 2, 2008

(54) OPTICAL ELEMENT AND ILLUMINATING DEVICE

(75) Inventor: Yuki Naoi, Hino (JP)

(73) Assignee: Konica Minolta Opto, Inc., Tokyo (JP)

(*) Notice: Subject to any disclaimer, the term of this patent is extended or adjusted under 35 U.S.C. 154(b) by 0 days.

(21) Appl. No.: 11/636,764

(22) Filed: Dec. 11, 2006

(65) Prior Publication Data
US 2007/0133101 A1    Jun. 14, 2007

(30) Foreign Application Priority Data
Dec. 14, 2005  (JP) ............................ 2005-360648

(51) Int. Cl.
*F21V 5/00* (2006.01)

(52) U.S. Cl. .................. 362/330; 362/26; 362/620; 362/626

(58) Field of Classification Search .......... 362/330, 362/626, 620, 26
See application file for complete search history.

(56) References Cited

U.S. PATENT DOCUMENTS

| | | | | |
|---|---|---|---|---|
| 6,347,874 B1* | 2/2002 | Boyd et al. | ................. | 362/628 |
| 6,578,985 B1* | 6/2003 | Seraphim et al. | ............ | 362/243 |
| 7,001,060 B1* | 2/2006 | Kimura | ..................... | 362/620 |
| 7,220,038 B2* | 5/2007 | Yamashita et al. | .......... | 362/606 |
| 7,226,197 B2* | 6/2007 | Hayashi et al. | ............. | 362/608 |

\* cited by examiner

*Primary Examiner*—Stephen F. Husar
*Assistant Examiner*—Jessica L McMillan
(74) *Attorney, Agent, or Firm*—Cohen Pontani Lieberman & Pavane LLP (57) ABSTRACT

The present invention provides an optical element and an illuminating device. The optical element includes: an incident surface; and an emitting section formed on an opposite side to the incident surface. The emitting section includes a plurality of protrusions. When each of the plurality of protrusions is projected onto a reference plane perpendicular to the incident surface to form a reference contour, the reference contour is substantially a trapezoid. A height of the reference contour and a height of a triangle formed by extending two legs of the reference contour satisfy a predefined condition.

13 Claims, 8 Drawing Sheets

OPTICAL ELEMENT AND ILLUMINATING DEVICE

This application is based on Japanese Patent Application No. 2005-360648 filed on Dec. 14, 2005, in Japanese Patent Office, the entire content of which is hereby incorporated by reference.

TECHNICAL FIELD

The present invention relates to an optical element capable of changing the traveling direction of the light emitted from a surface light emitting element, and an illuminating device provided with the aforementioned optical element.

BACKGROUND

In the conventional technique, a prism sheet is used so that the traveling direction of the light emitted from a surface illuminating device is condensed in the normal direction of the light emitting surface of the surface illuminating device, whereby the luminance in the aforementioned normal direction is increased. The prism sheet of this type is structured in such a way that triangular prisms and square pyramids are arranged without any gap on one side of the transparent flat plate, for example. The slope angle is adjusted to an appropriate level to obtain the intended optical path change characteristic, which is disclosed in Tokkai 2005-55481. The same Document discloses that this prism sheet does not lose substantial functions when the square pyramid is replaced by a truncated square pyramid.

However, the present inventors conducted various forms of simulation on the shape of the prism sheet and have found out the following: It is difficult that the desired optical path change characteristic is always obtained merely by adjusting the slope angle of the triangular prism or square pyramid, and that the light from the surface light emitting device is easily picked up efficiently in the normal direction of the light emitting surface, viz., in the front direction.

SUMMARY

Thus, an object of the present invention is to provide an optical element which can pick up efficiently the light from a surface light emitting element in the front direction.

Another object of the present invention is to provide an illuminating device incorporating the aforementioned optical element.

To solve the above problems, the optical element according to the present invention includes an incident surface on the optical element; and an emitting section formed on an opposite side of the optical element to the incident surface. The emitting section includes a plurality of protrusions. When each of the plurality of protrusions is projected onto a reference plane perpendicular to the incident surface to form a reference contour, the reference contour is substantially a trapezoid, and a height of the reference contour and a height of a triangle formed by extending two legs of the reference contour satisfy the predetermined condition.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Each of FIGS. 4(a) and 4(b) is the chart representing an example of the relationship between the front luminance and the slope angle of protrusion.

DESCRIPTION OF THE PREFERRED EMBODIMENT

The following describes the preferred embodiment according to the present invention:

The optical element according to the present invention is provided with (a) an incident surface on the optical element, and (b) an emitting section having a plurality of protrusions formed on an opposite side of the optical element to the incident surface. In the present optical element, when each of the plurality of protrusions is projected onto a reference plane perpendicular to the incident surface to form a reference contour, the reference contour is substantially a trapezoid. The optical element satisfies $$1 \leq (h2-h1)/h2 \times 100 \leq 35,$$

where h1 is a height of the reference contour, and h2 is a height of a triangle formed by extending two legs of the reference contour.

In the aforementioned optical element, the reference contour wherein each of the protrusions is projected on the reference plane vertical to the incident surface is approximately trapezoidal. Accordingly, part of the incident light flux having a smaller angle of inclination with respect to the incident surface passes through the horizontal surface corresponding to the upper side of the trapezoid of the protrusion and is emitted approximately in the front direction (in the direction of the first surface) of the optical element. Part of the incident light flux having a greater angle of inclination with respect to the incident surface passes through the slope corresponding to the leg of the trapezoid of the protrusion while being refracted, and is emitted approximately in the front direction of the optical element. Here, when the protrusion is assumed to have a cross section formed by cutting off the vertex of the triangle and there is provided an embodiment in which missing amount TA=(h2−h1)/h2×100 (%) exceeds 35%, it decreases the area of the slope that changes the traveling direction of the light. To be more specific, when the missing amount TA is kept 35% or below, a sufficient area of slope can be provided and the light flux whose direction has been changed by the slope can be emitted in the front direction, wherein a sufficient amount of light is ensured. In the meantime, if the missing amount TA is below 1%, it decreases in the area of the horizontal surface that emits the light flux in the front direction in the straight line. To be more specific, when the missing amount TA is kept 1% or more, the light flux likely to be condensed on the vertex of the protrusion can be emitted approximately in the front direction by the multiple reflection with the mirror provided on a light source wherein a sufficient amount of light is maintained. It should be noted that, if the missing amount TA is 0%, the pointed edge of the protrusion easily breaks off and the light is bent in an unexpected direction by the fragment, with the result that a sufficient amount of the light flux emitted in the front direction is hard to be obtained. Such a problem has been left unsolved.

In a specific embodiment of the present invention, according to the above optical element, the reference contour is substantially an isosceles trapezoid. In this case, the both lateral surfaces of each of the protrusions can emit a light flux having the same optical path change characteristics each other, which is preferable.

In another specific embodiment of the present invention, when each of the plurality of protrusions has an orthogonal contour formed by projecting each of the plurality of protrusions onto an orthogonal plane perpendicular to the incident surface and the reference plane, the orthogonal contour is substantially a trapezoid. In this case, the optical element provides a desired optical path change characteristics in not only the reference plane, but also the orthogonal plane. Therefore, it allows to pickup the light to front direction of the optical element, which is preferable.

In another specific embodiment of the present invention, each of the plurality of protrusions is a truncated rectangular pyramid. It allows to efficiently arrange the protrusions on a plane two-dimensionally, which is preferable.

In another specific embodiment of the present invention, each of the plurality of protrusions is a truncated square pyramid. In this case, it achieves the same optical path change characteristics in the reference plane and the orthogonal plane and allows to pick up the light to front direction of the optical element efficiency, which is preferable.

In another embodiment of the present invention, each of the plurality of protrusions includes: a horizontal surface formed on a top of each of the plurality of protrusions and transmitting a light flux entering substantially perpendicularly into the incident surface; and a plurality of slopes formed on respective laterals of the each of the plurality of protrusion and reflecting a light flux entering substantially perpendicularly into the incident surface. This condition can be adjusted by factors including a refractive index of a transparent material of the protrusions.

In another embodiment of the present invention, when the angle formed by the base and leg of the reference contour is assumed as $\beta(°)$ and the refractive index of the emitting section is assumed as "n", the following condition can be satisfied:

$$33 < \beta/\sqrt{n} < 39$$

Here, the value $DP=\beta/\sqrt{n}$ is a parameter representing the degree of changing the traveling direction of the incident light. For example, if the value $DP=\beta/\sqrt{n}$ is greater than 33, the effect of changing the traveling direction is increased and it will easily ensure the sufficient effect of the optical element picking up the light in the front direction. If the value $DP=\beta/\sqrt{n}$ is less than 39, there will be a decrease in the effect of converting the traveling direction. This will increase the light to be emitted in the front direction of the optical element, which is preferable.

In another embodiment of the present invention, the optical element is formed of polymethylmethacrylate, and satisfies $40.3°<\beta<47.6°$, where $\beta(°)$ is an angle between a base and a leg of the reference contour.

In another embodiment of the present invention, the emitting section has a shape in which the plurality of protrusions are continuously arranged with adjoining each other. The structure can take light therein without futility, and change the traveling direction of the light efficiently.

An illuminating device according to the present invention is provided with: (a) a surface light emitting element; (b) the optical element described above arranged at a first side of the surface light emitting element; and (c) a reflection element arranged at a second side of the surface light emitting element opposite to the first side.

The above illuminating device uses the optical element described above therein, and enhances the front luminance of the light picked up from the surface light emitting element.

In another embodiment of the present invention, the surface light emitting element preferably has a Lambertian light distribution property. It allows to increase the light emitted from horizontal surface on the top of the protrusion to the front direction of the optical element and the light emitted from the slopes arranged on laterals of the protrusion to the front direction of the optical element with good balance, and allows to increase utilization efficiency of the light, which is preferable.

In another embodiment of the present invention, in the above illuminating device, the surface light emitting element includes one of an organic electroluminescence (EL) element, an inorganic electroluminescence (EL) element and LED element. It allows to provide a small-sized illuminating device with high efficiency.

The preferred embodiment is described below in detail referring the drawings.

First Embodiment

Figure 1A:
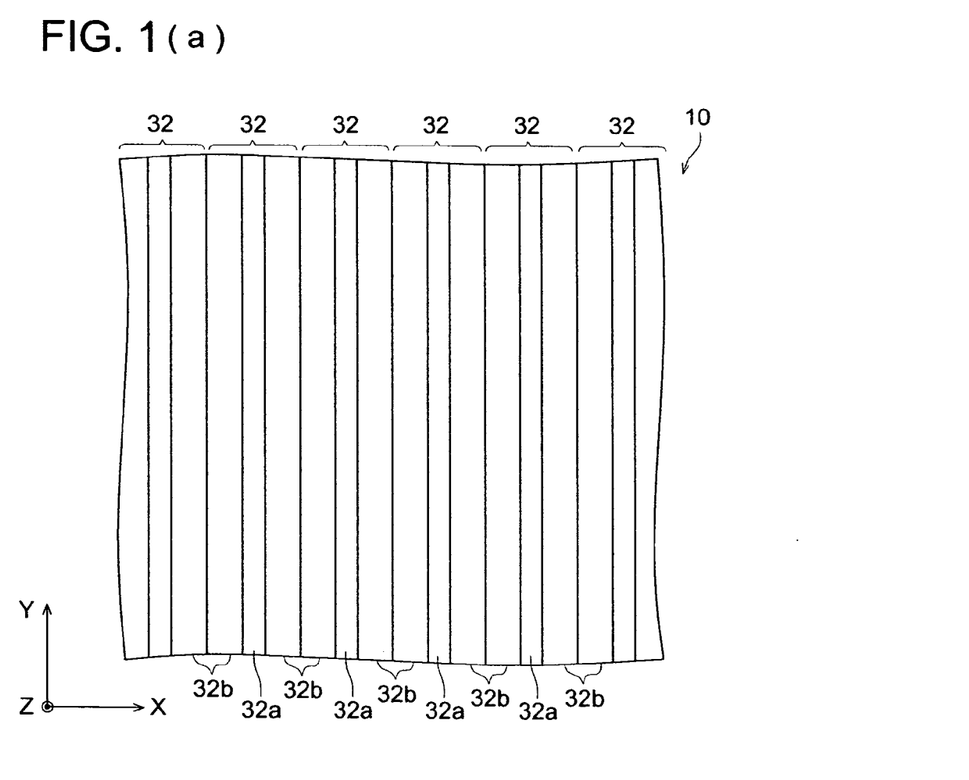
FIG. 1(a) is a plan view representing the illuminating device of a first embodiment.
Figure 1B:
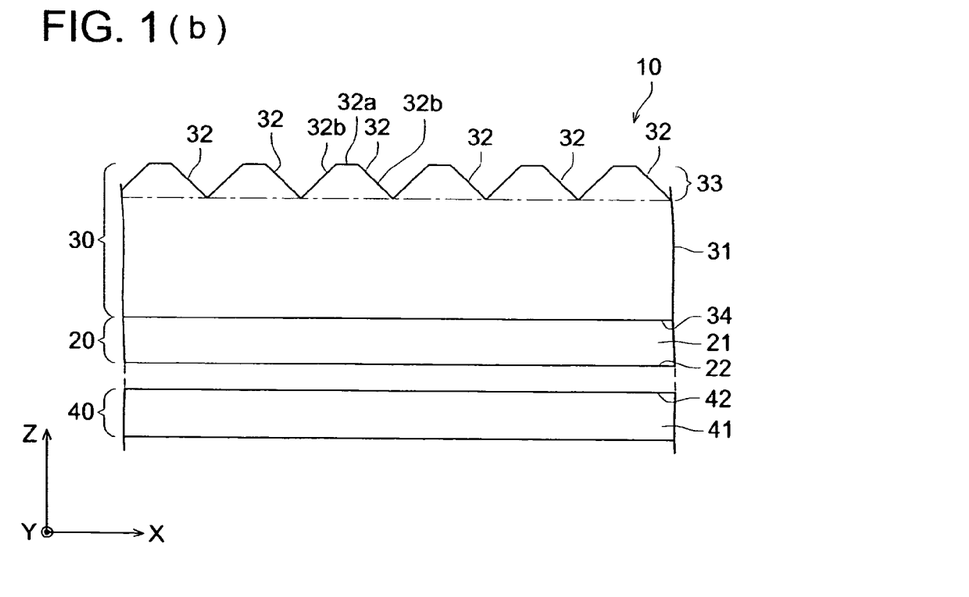
FIG. 1(b) is a lateral cross sectional view representing the illuminating device.

FIG. 1(a) is a partially enlarged plan view representing the illuminating device of a first embodiment, and FIG. 1(b) is a partially enlarged cross sectional view representing the illuminating device.

This illuminating device 10 has an organic electroluminescent element 20 as a surface light emitting device, a prism sheet 30 as an optical element, and a mirror member 40 as a reflection element.

The organic electroluminescent element 20 is made up of a light emitting layer 22 formed on a transparent substrate 21, wherein the light emitting layer 22 has a known structure. To be more specific, in the light emitting layer 22, an organic layer containing an organic luminescent material is sandwiched between a pair of electrodes. If a current flows across the electrode, the hole (positive hole) and electron are recombined to generate an exciton. The organic luminescent material is excited, and light is emitted when this material is to the basic status. It should be noted that the light emitting layer 22 has a Lambertian light distribution characteristic. To be more specific, light emitted from the light emitting layer 22 has a light distribution pattern that is expressed as $I0·\cos\theta$, assuming that the emission angle is $\theta$ wherein the normal direction of the light emitting layer 22 as a reference, and the light distribution pattern that is expressed as I0·cos θ. Namely, when viewed from the lateral position, the distribution pattern represents a circular cross section wherein the diameter is in the front direction of the luminescent center.

The prism sheet 30 is provided on the front side (on the side of the first surface) of the organic electroluminescent element 20. It has a transparent plate-formed substrate unit 31, and an emitting section 33 made up of a great number of prismatic protrusions 32. The substrate unit 31 is made up of a material such as glass and acryl resin, and a flat incident surface 34 is provided on the bottom on the side of the organic electroluminescent element 20. This incident surface 34 forms a boundary surface with the organic electroluminescent element 20. The emitting section 33 is formed on the side opposite the incident surface 34, and the protrusion 32 forming the emitting section 33 is a prism having a trapezoidal section formed by truncating the vertex of the triangle. To put it more specifically, the cross section geometry (i.e., reference contour) wherein the protrusion 32 is projected on the XZ surface (i.e. reference plane) vertical to the incident surface is formed in an isosceles trapezoid. The locus obtained by moving this isosceles trapezoid in the Y-axis direction is shaped like a protrusion 32. As a result, the emitting section 33 is structured in such a way that the protrusions 32 as trapezoidal prisms extending in the Y-axis direction are arranged in the X-axis direction continuously in the form adjoining to one another without any gap in-between. Each of the protrusions 32 has a horizontal surface 32a formed on the top end and slopes 32b formed on the laterals. The horizontal surface 32a corresponds to the upper side of the trapezoid, while the slope 32b corresponds to the leg of the trapezoid. It should be noted in passing that the refractive index of the substrate unit 31 can be made different from that of the emitting section 33, but in the following embodiment, these refractive indexes are assumed as the same for ease of explanation.

A mirror member 40 is arranged on the rear (on the second surface) of the organic electroluminescent element 20. It is made up of a transparent plate-formed substrate unit 41 and a reflection layer 42 formed on one of the substrate units 41. The substrate unit 41 is formed of, for example, glass or acryl resin. The reflection layer 42 is a flat reflective film formed on the upper surface on the side of the organic electroluminescent element 20. It should be noted that the substrate unit 41 can be made of various materials, without being restricted to glass and acryl resin. If light can be reflected by the substrate unit 41 per se, there is no need for providing a reflection layer 42. Further, in the case of a normal organic electroluminescent element 20, the electrode on the rear is formed of a metallic reflective film, a mirror member 40 is not necessary. Alternatively, the mirror member 40 need not be used.

In the aforementioned illuminating device 10, the light flux which is dispersed and emitted from the light emitting layer 22 of the organic electroluminescent element 20 and has a greater inclination in the normal direction of the light emitting layer 22 enters the prism sheet 30, and is refracted when passing through the slope 32b of the protrusions 32, with the result that the light component traveling in the Z-axis direction is enlarged. Further, the light flux, which has entered the prism sheet 30 and has a smaller inclination with respect to the normal direction of the light emitting layer 22, makes almost straight traveling across this horizontal surface 32a when it enters the horizontal surface 32a of the protrusions 32. Then it is emitted in the front direction of the protrusions 32. In the meantime, when the light flux having a greater inclination with respect to the normal direction of the light emitting layer 22 has entered the slope 32b of the protrusions 32, the incident light flux is reflected by the slope 32b. After that, it is further reflected in the illuminating device 10 repeatedly. In the final phase, it travels approximately vertically to the horizontal surface 32a and is emitted in the front direction of the protrusions 32. As a result, this procedure ensures display of a high degree of luminance in the front direction of the illuminating device 10 as the normal direction of the light emitting layer 22.

Referring to drawings, the following specifically describes an example of the optical path wherein light travels approximately vertically to the horizontal surface 32a and is emitted in the front direction of the protrusions 32.

Figure 2:
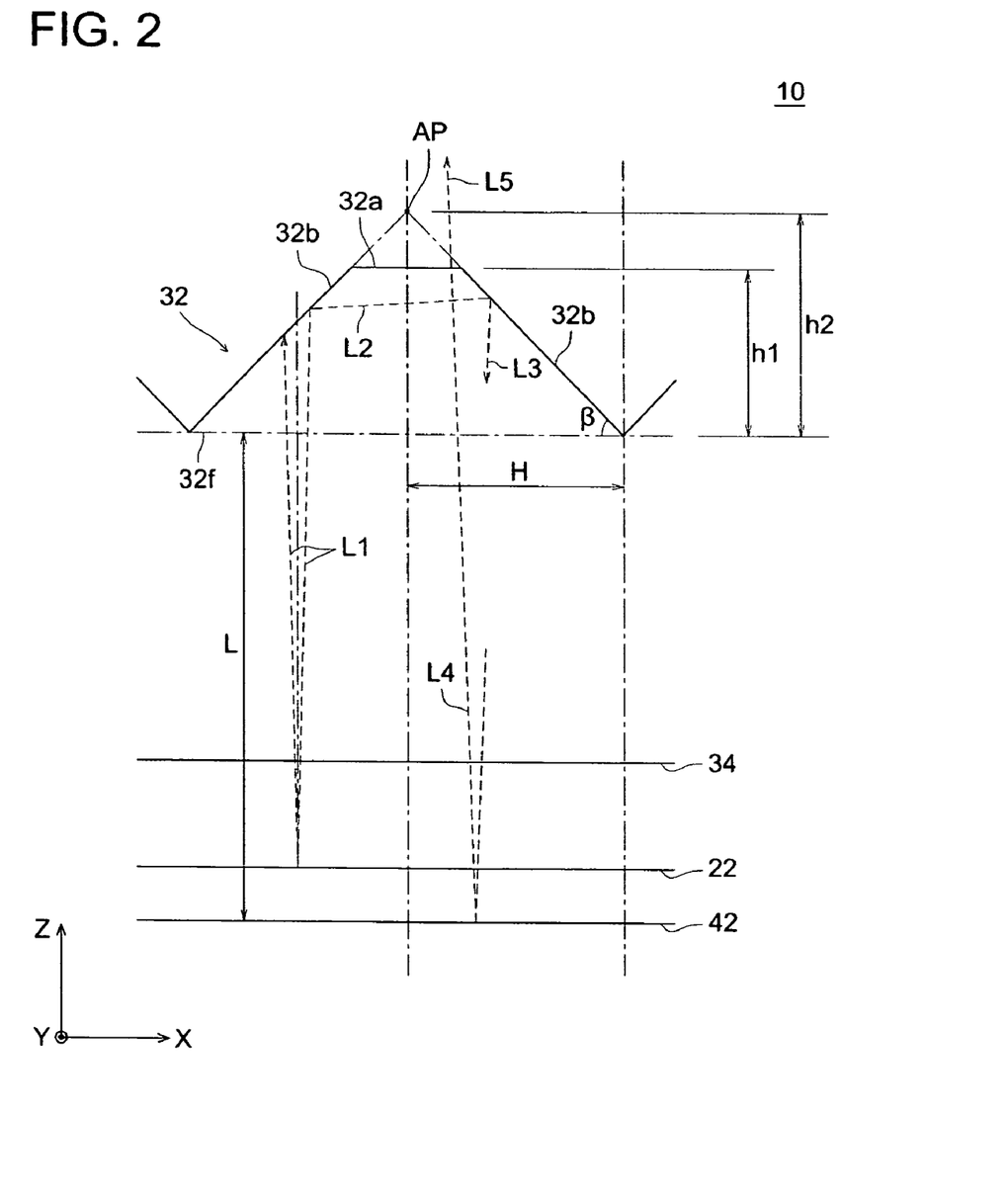
FIG. 2 is an enlarged cross sectional view representing the details of the shape of the illuminating device given in FIG. 1(a) and FIG. 1(b)

FIG. 2 is a cross sectional view representing the details of the shape of the illuminating device 10 shown in FIGS. 1(a) and 1(b). The following geographical contour will be defined in advance for the sake of expediency. In the first place, L denotes the distance from the reflection layer 42 of the mirror member 40 to the bottom end 32f on the lower end of the emitting section 33 of the prism sheet 30. In the protrusions 32 constituting the emitting section 33, a contour as a reference contour is formed by the horizontal surface 32a at the center and the slopes 32b on both laterals. AP indicates the vertex of the triangle formed by extension of two legs constituting the slope 32b. In the protrusions 32, widths on the right and left sides with this vertex AP sandwiched in-between are equal to each other, and are given by a half-value H of the pitch. Further, the angle at the base of the protrusions 32, i.e., the slope angle with respect to the bottom end surface 32 of the slope 32b is indicated by β(°). Further, the height of the protrusions 32, i.e., the distance from the bottom end surface 32f to the horizontal surface 32a is represented by h1, and the height of a triangle formed by extending the vertex side of the slopes 32b of the protrusions 32, i.e, the distance from the bottom end surface 32f to the vertex AP is h2.

It is assumed in the protrusions 32 as an example of this embodiment that, when the slope angle β of the slope 32b is approximately in the range from 40° through 50° centering on 45°, the light flux (normal light flux) which is emitted approximately along the normal direction of the light emitting layer 22 to travel approximately vertically to the incident surface 34 is fully reflected by the slope 32b. Such a condition can be met by setting the refractive index of the emitting section 33, i.e., protrusions 32. Of the light fluxes coming from the prism sheet 30, the light flux L1 (FIG. 2) having a smaller inclination in the normal direction of the light emitting layer 22 will be discussed below. Under the aforementioned condition, if the light flux L1 having a smaller inclination in the normal direction of the light emitting layer 22 has entered the horizontal surface 32a of the protrusions 32, the light flux L1 makes almost straight traveling across this horizontal surface 32a, and is emitted in the front direction of the protrusions 32. In the meantime, when the light flux L1 having a smaller inclination has entered the slope 32b of the protrusions 32, the light flux L1 is fully reflected by this slope 32b. Such a fully reflected light is further fully reflected by another slope 32b opposite the first slope 32b, and is returned to the light emitting layer 22 to become return light L3. A mirror member 40 is arranged on the back of the light emitting layer 22 so that the light again becomes the forward traveling light L4 that travels toward the protrusions 32. The forward traveling light L4 having been reflected by the mirror member 40 is a light flux that travels approximately in the front direction. As a result, this light enters the slope 32b again in some cases. However, when it has entered the horizontal surface 32a, the light passes through the horizontal surface 32a and becomes the emitted light L5 that is emitted in the front direction of the protrusions 32. For the aforementioned reasons, for the prism sheet 30 that fully reflects the light flux in the front direction which is a normal light flux when the slope angle β of the slope 32b is in the range from 40° through 50°, it is preferred in particular that a horizontal surface 32a should be provided on the top of the protrusions 32.

As described above, the protrusion 32 is shaped like a cross section created by cutting off the vertex of a triangle. Its missing amount TA (%) is given by (h2−h1)/h2×100. Using the following Examples, the present inventors have verified that the front luminance of the illuminating device 10 can be improved considerably by adjusting the aforementioned missing amount TA to the light distribution characteristic of the light emitting layer 22.

EXAMPLE 1

In the Example 1, the material of the substrate unit 31 of the prism sheet 30 was a resin (n=1.49 or 1.60) such as polymethylmethacrylate, and the substrate unit 31 of the prism sheet 30 had dimensions of 1150×1150×0.13 mm. The transparent substrate 21 of the organic electroluminescent element 20 had the dimensions of 1150×1150×0.05 mm, and was made of BK7. Further, the substrate unit 41 of the mirror member 40 was a disk having a diameter of 2000 mm and a thickness of 50 μm and was made of BK7. The slope angle β of the protrusions 32 provided on the prism sheet 30 was 45°. Further, the thickness L of the substrate unit 31 of the prism sheet 30 and organic electroluminescent element 20 was 200 μm, and the pitch 2H of the prismatic protrusions 32 was 100 μm.

In the aforementioned structure, the missing amount TA was changed in the range from 0% through 50%. The protrusions 32 had a reference contour of isosceles trapezoid, and pitch 2H=100 μm. Thus, h2=50 μm. This makes it clear that h1 changes in the range from 50 μm through 25 μm. For example, if the missing amount TA is 10%, h1=45 μm.

Figure 3:
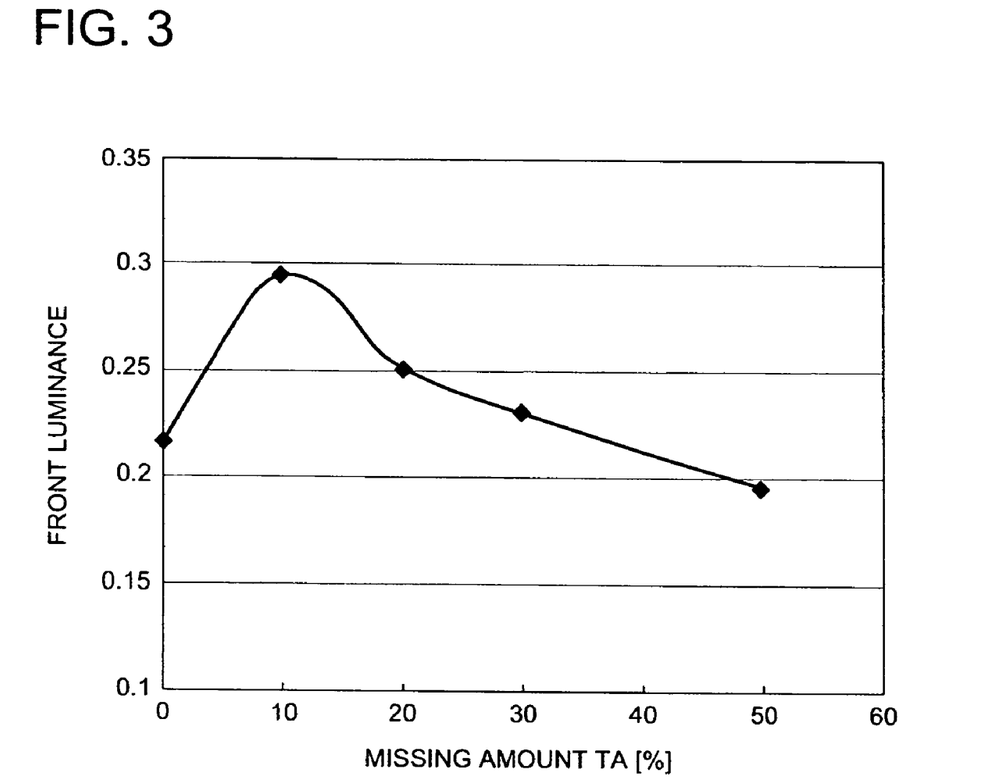
FIG. 3 is a chart representing an example of the relationship between the front luminance and missing amount in the illuminating device of the first embodiment.

FIG. 3 is a chart representing the relationship between the front luminance and missing amount TA in the illuminating device 10 gained from Example 1. In this case, n=1.49 and β=45°. As is apparent from the chart, when the missing amount TA is 10%, the front luminance indicates the maximum value.

When the missing amount TA of the protrusions 32 provided on the prism sheet 30 is 1% through 35%, the front luminance is equal to or greater than 0.236 (80% of the maximum value 0.295). When the missing amount TA is 5% through 17%, the front luminance is equal to or greater than 0.266 (90% of the maximum value 0.295). When the missing amount TA is 7% through 13%, the front luminance is 0.280 (95% of the maximum value 0.295).

Likewise, when n=1.60 and β=45°, the front luminance indicates the maximum value if the missing amount TA is 10%.

Tables 1 and 2 show the relationship between the front luminance of the illuminating device 10 of the present embodiment and the missing amount TA when n=1.49 and β=45°, and when n=1.60 and β=45°.

In this case, the front luminance ratio denotes the front luminance as compared with that provided when the protrusions 32 are not formed.

TABLE 1

The maximum value is 0.295 (front luminance ratio: 2.15) when h2 = 50 μm, n = 1.49, β = 45° and the missing amount is 10%.

| Missing amount | h1 (μm) | Front luminance | Ratio of the front luminance to the maximum front luminance when the missing amount is 0% through 50% |
|---|---|---|---|
| 7-13% | 46.5-43.5 | 0.280 or more | 95% or more |
| 5-17% | 47.5-41.5 | 0.266 or more | 90% or more |
| 1-35% | 49.5-32.5 | 0.236 or more | 80% or more |

TABLE 2

The maximum value is 0.279 (front luminance ratio: 2.03) when h2 = 50 μm, n = 1.60, β = 45° and the missing amount is 10%.

| Missing amount | h1 (μm) | Front luminance | Ratio of the front luminance to the maximum front luminance when the missing amount is 0% through 50% |
|---|---|---|---|
| 7-13% | 46.5-43.5 | 0.265 or more | 95% or more |
| 5-17% | 47.5-41.5 | 0.251 or more | 90% or more |
| 1-35% | 49.5-32.5 | 0.223 or more | 80% or more |

In the example shown in Table 1, the front luminance has a maximum value of 0.295 when the missing amount is 10%. This means that, when the protrusions 32 are formed, the front luminance is 2.15 times that when the protrusions 32 are not formed.

In the example shown in Table 2, the front luminance has a maximum value of 0.279 when the missing amount is 10%. This means that, when the protrusions 32 are formed, the front luminance is 2.03 times that when the protrusions 32 are not formed.

To be more specific, although the front luminance depends on the refractive index of the prism sheet 30 and the slope angle β of the slope 32b, it tends to exhibit the maximum value when the missing amount TA is around 10%. This has been verified by this example.

The following describes the discusses why the front luminance exhibits the maximum value when the missing amount TA of the protrusions 32 is around 10%. The protrusions 32 are expected to allow free passage of the light traveling approximately in the front direction, and to allow passage of the light having a greater inclination from the front direction only after making adjustment in such a way that the light will travel in the front direction. In the former case, the horizontal surface 32a of the protrusions 32 is valid. In the latter case, a combination of the slope 32b of the protrusions 32, mirror member 40 and horizontal surface 32a is valid.

When there is an increase in the missing amount TA of the protrusions 32, there will be an increase in the area of horizontal surface 32a of the protrusions 32. This ensures efficient emission of the light that travels approximately in the front direction. In the meantime, since there is a decrease in the area of the slope 32b of the protrusions 32, the function of adjusting the light that has a greater inclination from the front direction will be weakened, with the result that the efficiency of emission in the front direction is reduced. This suggests that increase in the missing amount TA causes a temporary increase in front luminance, and then a decrease in front luminance beyond a certain value. This will provide a characteristic curve as shown in FIG. 3. It can also be estimated that, when the missing amount is around 10%, the aforementioned two functions are kept in balance, and the front luminance exhibits the maximum value.

The aforementioned Example shows that, when the refractive index n of the prism sheet 30 is around 1.49 through 1.60 and the slope angle β of the slope 32b is around 45°, the following trend is exhibited: The missing amount TA for keeping the front luminance at 95% or more of the maximum value is approximately in the range from 7% through 13%. This can be expressed by the following equation:

$$7 \leq (h2-h1)/h2 \times 100 \leq 13 \quad (1)$$

Further, the missing amount TA for keeping the front luminance at 90% or more of the maximum value is approximately in the range from 5% through 17%. This can be expressed by the following equation:

$$5 \leq (h2-h1)/h2 \times 100 \leq 17 \quad (2)$$

Further, the missing amount TA for keeping the front luminance at 80% or more of the maximum value is approximately in the range from 1% through 35%. This can be expressed by the following equation:

$$1 \leq (h2-h1)/h2 \times 100 \leq 35 \quad (3)$$

It has been verified by experiment that, in the conventional illuminating device, the maximum value of the front luminance is increased only about 1.7 as compared to the case where a prism sheet is not provided. To be more specific, the front luminance can be enhanced two times or more by intentionally forming a missing of about 10% on the protrusions 32 of the prism sheet 30, as compared to the case where protrusions 32 are not formed. Not only that, the front luminance can be increased 1.2 times or more, as compared to the conventional illuminating device where no missing is formed on the protrusions 32.

Referring to the drawing, the following describes the relationship between the refractive index n and slope angle β of the protrusions 32 obtained from Example 1, and the front luminance.

Figure 4A:
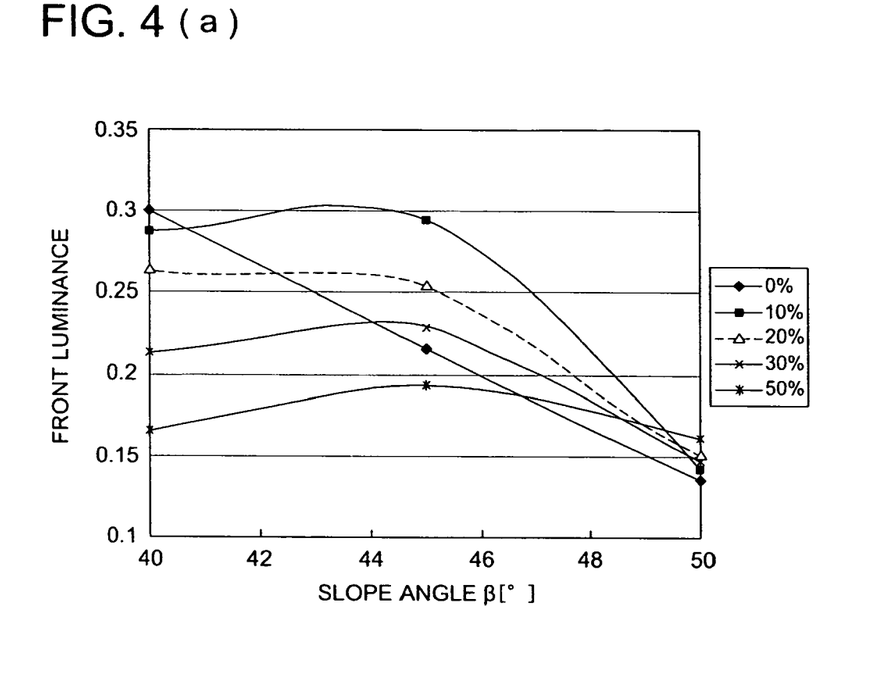
Figure 4B:
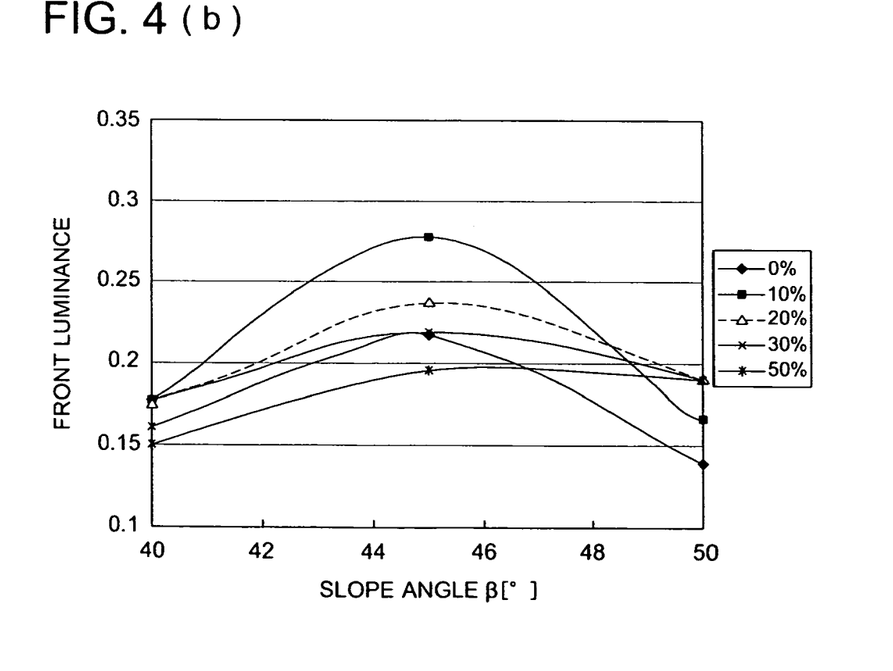

Each of FIGS. 4(*a*) and 4(*b*) is a chart representing an example of the relationship between the front luminance of the illuminating device 10 and the slope angle β of the protrusions 32, when the slope angle β of the protrusions 32 provided on the prism sheet 30 is changed from 40° through 45° to 50° in Example 1. FIG. 4(*a*) shows the result when the refractive index of the prism sheet 30 is n=1.49, while FIG. 4(*b*) shows the result when the refractive index of the prism sheet 30 is n=1.60.

As shown in FIG. 4(*a*), when n=1.49 in the Comparative Example of missing amount TA=0%, the front luminance decreases as the slope angle β increases from 40° to 50°. In the meantime, in the Example wherein missing amount TA=10% through 30%, as there is an increase in the slope angle β from 40° to 50°, the front luminance exhibits a temporary increase, and then assumes the maximum value when β=44° through 46°. This is then followed by a decrease. In the example of missing amount TA=50%, as the slope angle β increases from 40° to 50°, the front luminance exhibits a temporary increase and then assumes the maximum value when β=45°. This is then followed by a decrease.

As shown in FIG. 4(*b*), when n=1.60 in the Comparative Example of missing amount TA=0%, as the slope angle β increases from 40° to 50°, the front luminance exhibits a temporary increase, and then assumes the maximum value when β=approximately 44°. This is then followed by a gradual decrease. However, when missing amount TA=0%, the protrusions 32 has no horizontal surface 32a. It means that the protrusions have no function to take out the light having smaller inclination from the front direction in the front direction. As a result, there is a small amount of light that can be taken out to the front. Further, it is difficult to achieve an accurate transfer from the die on the pointed edge of the protrusion 32. This may create an irregular profile of the front end. Even if the accurate transfer can be achieved, the front end is likely to be chipped. The light is bent in an unexpected direction by the fragment thereof, and the light emitted in the front direction of the protrusions 32 cannot be obtained sufficiently. In the Example wherein missing amount TA=10% through 35%, as the slope angle β increases from 40° to 50°, the front luminance exhibits a temporary increase, and then assumes the maximum value when β=44° through 46°. This is then followed by a decrease. In the example wherein missing amount TA=50%, as the slope angle β increases from 40° to 50°, the front luminance exhibits a temporary increase, and then assumes the maximum value when β=approximately 46°. This is then followed by a decrease.

The following describes the relationship between the refractive index n of the protrusions 32 and slope angle β. As will be apparent from FIG. 4(*a*) and FIG. 4(*b*), if there is an increase in the refractive index n of the protrusions 32, the slope angle β that provides the maximum value of the front luminance is also increased. Thus, in the charts FIGS. 4(*a*) and 4(*b*), assume that there is a common parameter that ensures agreement between the maximum values of the front luminance. This parameter is assumed as $\beta/n^x$ (x=0.1 through 2) to be fitted to the example data. It has been made clear that, when $\beta/\sqrt{n}$ is taken as a common parameter, there is an approximate agreement between the peaks of the data of FIG. 4(*a*) and that of FIG. 4(*b*). The aforementioned parameter $\beta/\sqrt{n}$ can be viewed as the parameter that expresses the degree of the function of converting the traveling direction of the incident light. To be more specific, if there is an increase in the slope angle β of the protrusions 32, there is an increase in the bending function for the light emitted from the light emitting layer 22 in the front direction. If the square root $\sqrt{n}$ of the refractive index of the protrusions 32 increases, there is a decrease in the bending function for the light emitted from the light emitting layer 22 in the front direction. If balance is maintained by the same degree of increase of the both, the function of the slope 32b changing the traveling direction of the incident light can be considered as being maintained relatively constant.

Figure 5A:
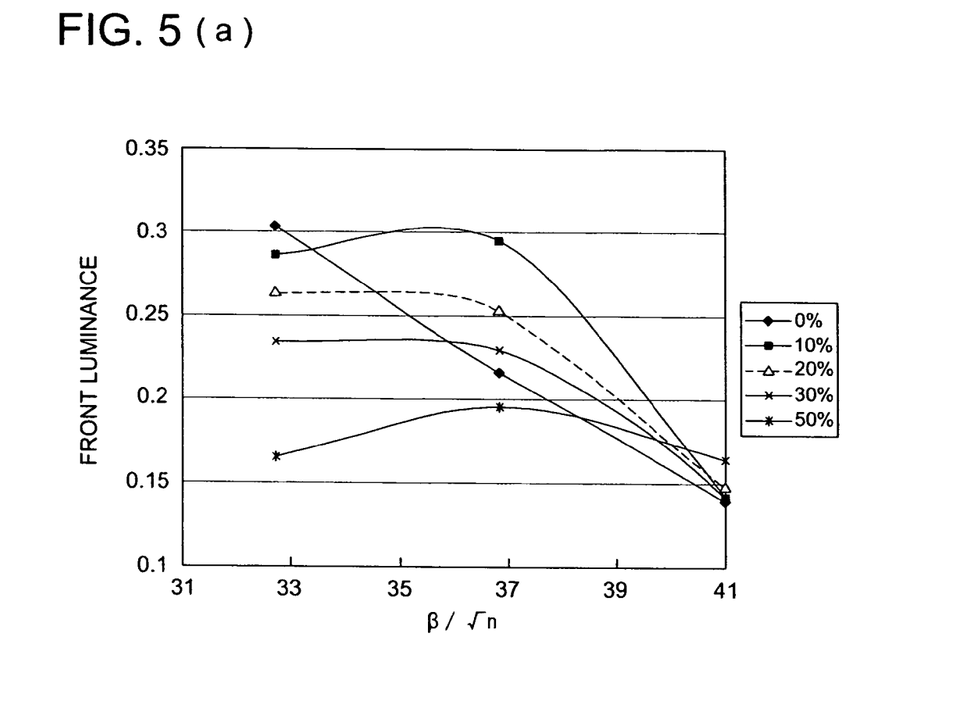
FIGS. 5(a) and 5(b) are charts representing the change in front luminance wherein the horizontal axis indicates a parameter $\beta/\sqrt{n}$.
Figure 5B:
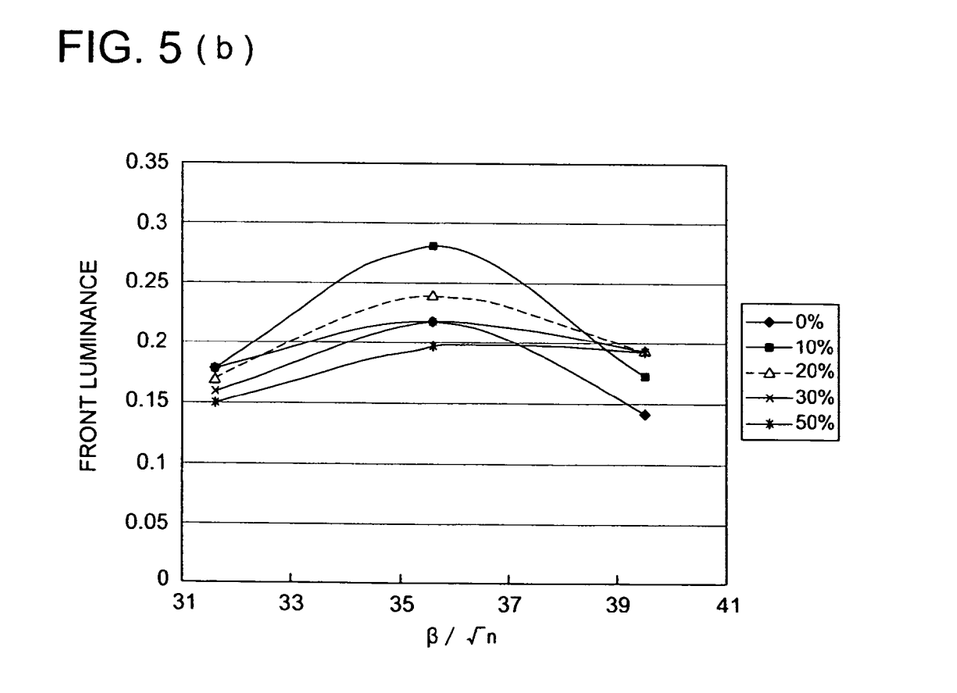

Each of FIGS. 5(*a*) and 5(*b*) is a chart representing the change in front luminance wherein the horizontal axis indicates a parameter $\beta/\sqrt{n}$. FIG. 5(*a*) shows the result obtained when the refractive index "n" of the prism sheet 30 is 1.49. FIG. 5(*b*) represents the result obtained when the refractive index "n" of the prism sheet 30 is 1.60. It can be seen that the maximum value is exhibited in both the FIGS. 5(*a*) and 5(*b*) when $\beta/\sqrt{n}$ is approximately 35.5.

As is clear from the two charts, to get a sufficiently large front luminance in the illuminating device 10 of the present invention, it is preferred that the following conditional formula should be met:

$$33 < \beta/\sqrt{n} < 39 \quad (4)$$

In this case, β is kept in the following range:

$$40.3° < \beta < 47.6° \text{ for n=1.49},$$

$$41.7° < \beta < 49.3° \text{ for n=1.60}.$$

When value $DP=\beta/\sqrt{n}$ is 33 or less, there is a decrease in the function of conversing the traveling direction of the light passing through the slope 32b of the protrusions 32. As a result, the effect of picking up the light in the front direction of the optical element is not obtained sufficiently. When value $DP=\beta/\sqrt{n}$ is 39 or more, there is an increase in the function of converting the traveling direction of the light passing through the slope 32b. As a result, there is a trend for decreasing the amount of light emitted in the front direction of the optical element.

It is more preferred that the following conditional formula should be met:

$$34 < \beta/\sqrt{n} < 37 \quad (5)$$

wherein β is kept in the following range:

41.5°<β<45.2° for n=1.49, 43.0°<β<46.8° for n=1.60.

It can be seen in this case that the front luminance of the light emitted from the illuminating device 10 is set to a higher level.

It is still more preferred that the following conditional formula should be met:

$$34.5 < \beta/\sqrt{n} < 36.5 \quad (6)$$

wherein β is kept in the following range:

42.1°<β<44.6° for n=1.49, 43.6°<β<46.2° for n=1.60.

It can be seen in this case that the front luminance of the light emitted from the illuminating device 10 is set to a still higher level.

Table 3 shows the range of β value in the formulas (4) through (6).

TABLE 3

|  |  | n = 1.49 | n = 1.6 |
|---|---|---|---|
| Formula (4) | 33 < β/√n < 39 | 40.3° < β < 47.6° | 41.7° < β < 49.3° |
| Formula (5) | 34 < β/√n < 37 | 41.5° < β < 45.2° | 43.0° < β < 46.8° |
| Formula (6) | 34.5 < β/√n < 36.5 | 42.1° < β < 44.6° | 43.6° < β < 46.2° |

In the illuminating device 10 of the aforementioned first embodiment, the prismatic protrusions 32 are arranged in the X-axis direction without gap. A gap made up of a slender belt-shaped emission surface, for example, parallel to the XY plane and extending in the Y-axis direction can be provided between protrusions 32.

In the aforementioned illuminating device 10, the horizontal surface 32a on the top end of each protrusion 32 can be replaced by a curved surface having slight projections and depressions. In the present specification, the "horizontal surface" includes such a curved surface. Namely, the reference contour of the protrusion 32 is not limited to the complete trapezoidal shape with a flat top end and it may at least be substantially trapezoidal shape which is formed by cutting off the vertex of a triangle. In this case, the advantages as those of the illuminating device 10 of the aforementioned first embodiment can be obtained. In this case, the definitions of the distance L, half-value of pitch H, slope angle β and distance h2 remain unchanged. When the distance h1 from the bottom end surface 32f to the horizontal surface 32a is replaced by the vertex (center) of the curved surface to the top end of the protrusions 32 from the bottom end surface 32f, the aforementioned formulas (1) through (6) substantially become valid. It should be noted that, when the horizontal surface 32a is replaced by a curved surface (in the present specification, this is included in the "horizontal surface"), excessive conversion of the traveling direction of the light can be avoided. Further, it is possible to reduce the glare when the illuminating device 10 is observed from the front surface, and to provide illumination light of mild impression. Moreover, if the top end of the protrusions 32 is made convex, manufacturing ease is ensured, and the possibility of the protrusions 32 being chipped is further reduced.

In the illuminating device 10 of the first embodiment, prism sheets 30 can be placed in two stacks. In this case, if the protrusions 32 of each prism sheet 30 are made to extend in the X- and Y-axis directions perpendicular to each other, light can be emitted from the front direction of the optical element with high efficiency in both the XZ- and YZ-planes.

Second Embodiment

The following describes the illuminating device of the second embodiment. The illuminating device of the second embodiment is a result of partial modification of the apparatus of the first embodiment. To avoid duplication, the same components as those of the first embodiment will not be described. The same components in the drawings will be assigned with the same reference numerals.

Figure 6A:
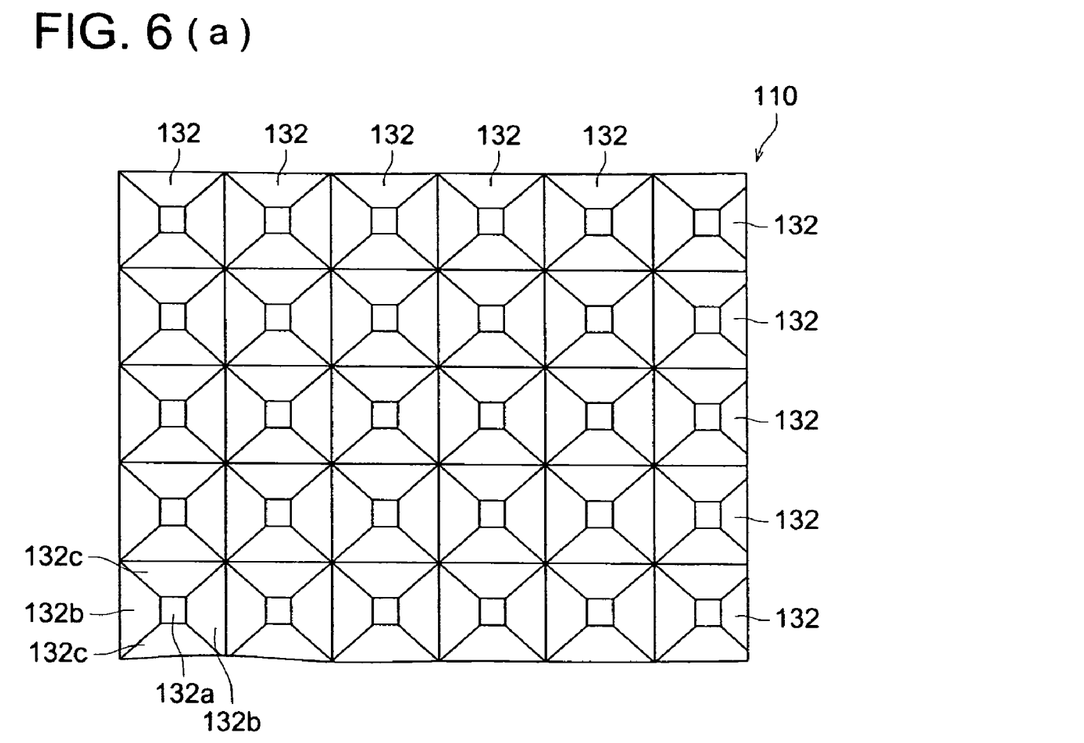
FIG. 6(a) is a plan view showing the illuminating device of a second embodiment.
Figure 6B:
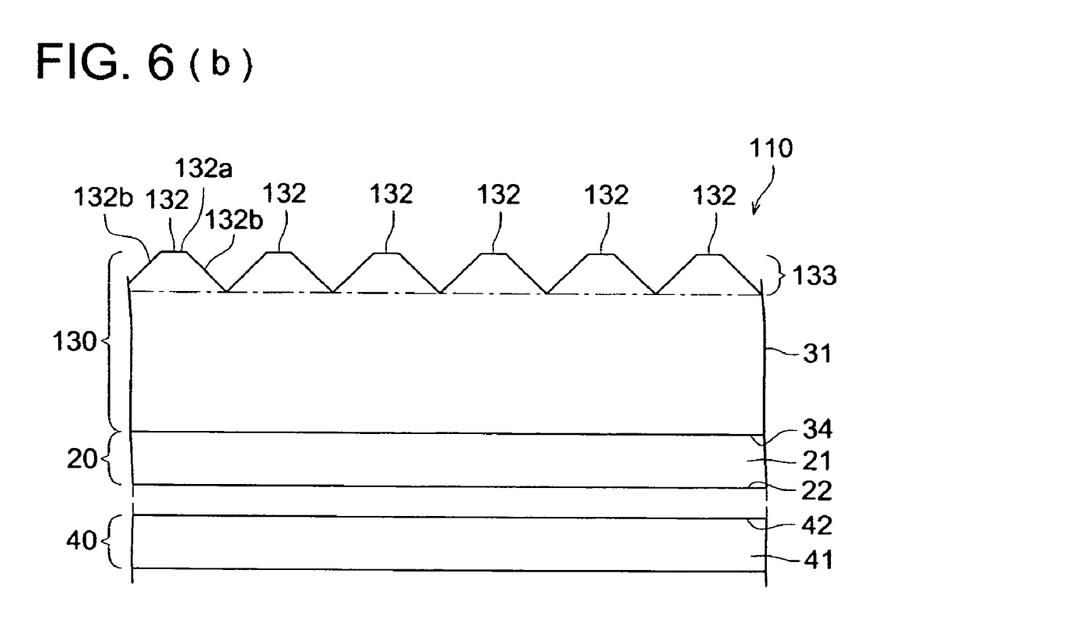
FIG. 6(b) is a lateral cross sectional view of the illuminating device.

FIG. 6(a) is a partially enlarged plan view showing the illuminating device of a second embodiment, and FIG. 6(b) is a partially enlarged lateral cross sectional view of the illuminating device. In this illuminating device 110, the prism sheet 130 as an optical element includes an emitting section 133 made up of a great number of pyramidal protrusions 132 that are located on the upper portion of the transparent plate-formed substrate unit 31. Each of the protrusions 132 is a truncated square pyramidal transparent member having a trapezoidal cross section which is formed by truncating a triangular vertex. To put it more specifically, the cross section geometry (i.e. reference contour) formed by projecting the protrusion 132 on the XZ surface (i.e., reference plane) perpendicular to the incident surface is an isosceles trapezoid, and the cross section geometry (i.e., orthogonal contour) formed by projecting the protrusion 132 onto the incident surface and the YZ plane (i.e., orthogonal plane) perpendicular to the XZ plane is also an isosceles trapezoid. The protrusions 132 are arranged on the substrate unit 31 continuously so as to be adjoining in a matrix form without gap in the X-axis direction and in the Y-axis direction. Each of the protrusions 132 has a horizontal surface 132a formed on the top end has a slope 132b formed along the X-axis and a slope 132c formed along the Y-axis. To be more specific, the horizontal surface 132a corresponds to the upper side of the cross sectional trapezoid, and the slopes 132b and 132c correspond to the cross sectional trapezoidal leg.

Figure 7:
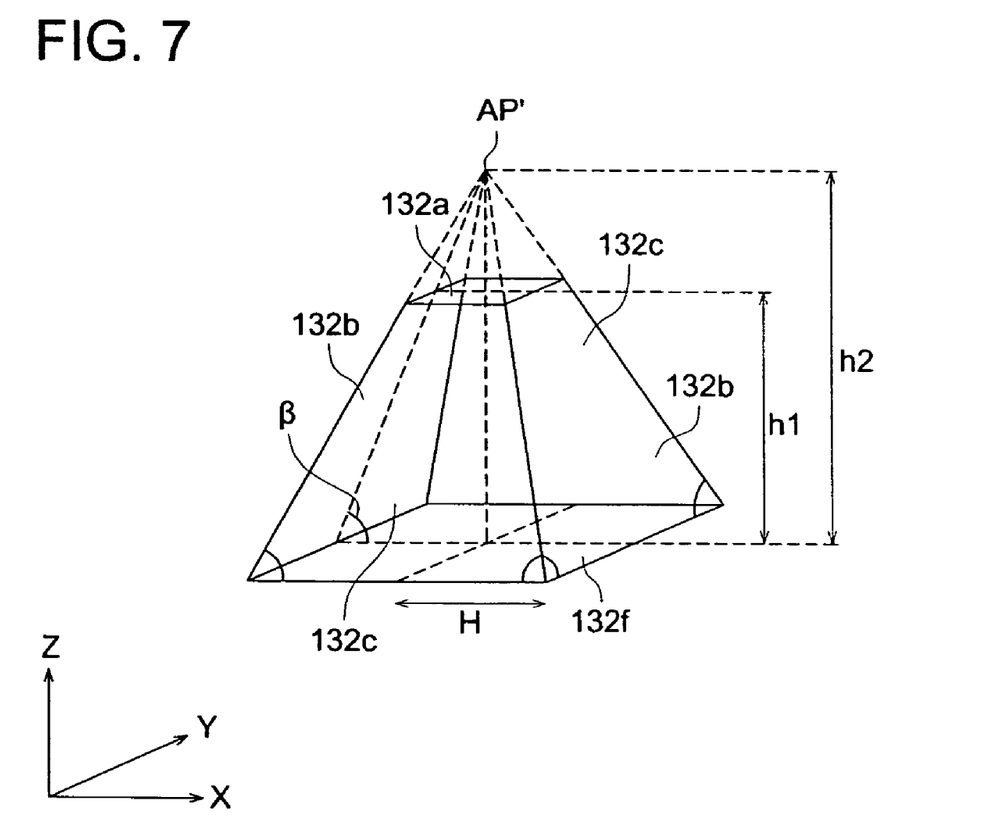
FIG. 7 is an enlarged perspective view of the protrusions of the illuminating device shown in FIGS. 1(a) and 1(b)

FIG. 7 is an enlarged perspective view of the protrusion 132. The contour and dimensions of the protrusion 132 are defined approximately in the same way as in FIG. 2. In the protrusion 132, AP' denotes the vertex which is formed by the intersection of the following two lines; a line of intersection which runs in the Y-axis direction obtained by extending a pair of mutually opposing slopes 132b and 132b, and a line of intersection which runs in the X-axis direction obtained by extending a pair of the slopes 132c and 132c. The half-value of the pitch of the protrusion 132 is given by H corresponding to half the side of the regular square constituting the bottom surface 132f of the protrusion 132. The slope angle of the protrusion 132 is given by β which is an angle formed by the slopes 132b and 132b, and the bottom surface 132f. Further, h1 denotes the height of the protrusion 132, namely the distance from the bottom surface 132f to the horizontal surface 132a, and h2 indicates the height when the vertex of the protrusion 132 is extended, namely the distance from the bottom end surface 132f to the vertex AP'.

In this illuminating device 110, the light flux which is dispersed and emitted from the light emitting layer 22 of the organic electroluminescent element 20 and which has greater inclination with respect to the normal direction of the light emitting layer 22 enters a prism sheet 130. When it passes through two slopes 132b of the protrusion 132, the traveling direction of the light having inclination in each of the X-axis and Y-axis directions with respect to the normal direction of the light emitting layer 22 is converted. The light flux which has entered the prism sheet 130 and which has smaller inclination with respect to the normal direction of the light emitting layer 22 is emitted in the front direction of the protrusion 132 through approximately straight traveling across the horizontal surface 132a when it has entered the horizontal surface 132a of the protrusion 132. This process provides display of a high level of luminance in the front direction of the illuminating device 110 as the normal direction of the light emitting layer 22.

For the prism sheet 130 wherein the light emitted in the front direction from the light emitting layer 22 is totally reflected when the slope angle β of the slopes 132b and 132c is in the range from 40° through 50° centering on 45°, it is preferred in particular that a horizontal surface 132a should be provided on the upper portion of the protrusion 132. This is the same as in the first embodiment.

EXAMPLE 2

The illuminating device 110 of the second embodiment was verified in the same manner as the first embodiment. The prism sheet 130 was made of resin such as PMMA. The substrate unit 131 of the prism sheet 130 had dimensions of 1.15×1.15×0.13 mm, and the prismatic protrusion 132 has a pitch 2H of 0.2 mm. Further, the transparent substrate 21 of the organic electroluminescent element 20 had dimensions of 1.0×1.0×0.5 mm, and was made of BK7. The substrate unit 41 of the mirror member 40 used was a disk having a diameter of 2.0 mm with a thickness of 0.1 mm, and was made of BK7. The missing amount TA of the protrusion 132 provided on the prism sheet 130 was changed in the range from 0% through 50%.

The reference contour of the protrusion 132 and orthogonal contour were formed in an isosceles trapezoid, with a pitch 2H of 0.2 mm. When β=45°, h2=100 μm. It is apparent that h1 changes in the range from 100 μm through 50 μm. For example, when the missing amount TA is 10%, h1=90 μm.

Figure 8A:
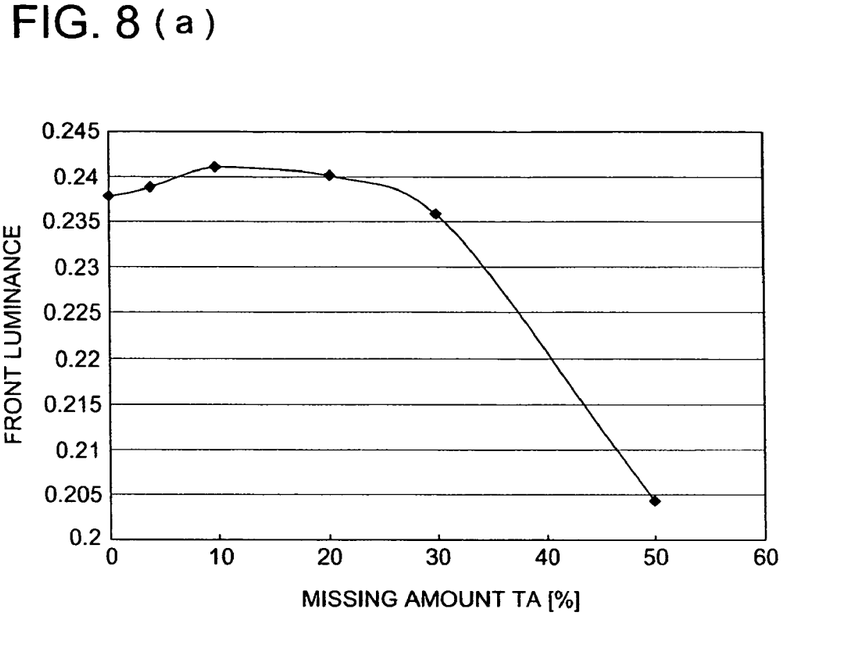
FIG. 8(a) is a chart representing an example of the relationship between the front luminance and missing amount in the illuminating device of the second embodiment.

FIG. 8(a) is a chart representing an example of the relationship between the front luminance and missing amount TA in the illuminating device 110 obtained from the second embodiment. It corresponds to FIG. 3 of the first embodiment. In the example shown in FIG. 8(a), n=1.49 and β=45°. As is apparent from the chart, the front luminance shows the maximum value when the missing amount TA is ten and several percent. Further, when the missing amount TA of the protrusion 132 provided on the prism sheet 130 is 1% through 35% (h1 is 90 μm through 75 μm), the front luminance is 0.235, and is 98% or more of the maximum value of 0.241.

The range of the missing amount TA wherein the front luminance is 99.5% or more of the maximum value is approximately 7% through 20% (where h1 denotes 93 μm through 80 μm). The range of the missing amount TA wherein the front luminance is 99% or more of the maximum value is approximately 6% through 22% (where h1 denotes 94 μm through 78 μm).

To be more specific, if the range of the missing amount TA is 1% through 35%, i.e.

$$1 \leq (h2-h1)/h2 \times 100 \leq 35 \qquad (3)$$

then the front luminance becomes 85% or more of the maximum value, with the result that the front luminance of the illuminating device 110 is improved.

Figure 8B:
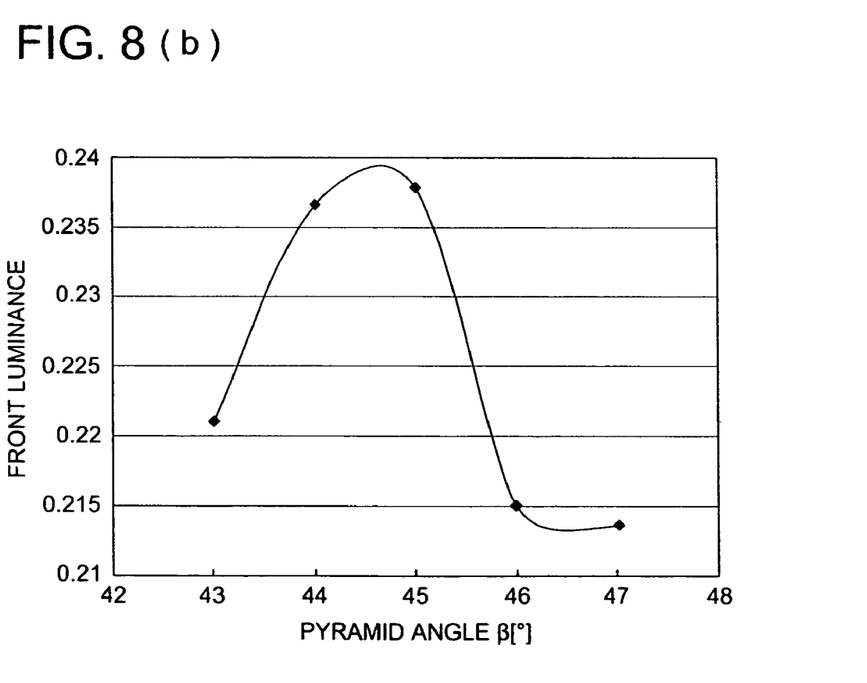
FIG. 8(b) is a chart representing an example of the relationship between the front luminance and the slope angle of protrusion.

FIG. 8(b) is a chart representing an example of the relationship between the front luminance of the illuminating device 110 and the slope angle β when the slope angle β of the protrusion 132 provided on the prism sheet 130 is changed from 43° through 47°. This Figure corresponds to FIG. 4(a) of the first embodiment. As is apparent from the chart, when n=1.49, as the slope angle β increases from 40° to 50°, there is a temporary increase in the front luminance. After exhibiting the maximum value when β=44° through 45°, the slope angle β decreases.

Although detailed description is omitted, the aforementioned study of the illuminating device 110 has make it clear that, to get a sufficiently high level of front luminance in the illuminating device 110 of the present embodiment, the parameter $\beta/\sqrt{n}$ is preferably in the range from 33 through 39, more preferably in the range from 34 through 37, and most preferably in the range from 34.5 through 36.5.

The value of β corresponding to each range of the parameter $\beta/\sqrt{n}$ is the same as that of Table 3 in the first embodiment.

In the illuminating device 110 of the aforementioned second embodiment, prismatic protrusions 132 are arranged in the form of matrix without any gap. A gap made up of a grid-like emission surface can be provided between these protrusions 132.

In the aforementioned illuminating device 110, the horizontal surface 132a on the top end of each protrusion 132 can be replaced by a curved surface having slight projections and depressions. In the present specification, "horizontal surface" also includes such a curved surface. The same advantages can be ensured in this case as well. Namely, the reference contour of the protrusion 132 is not limited to the complete trapezoidal shape with a flat top end and it may at least be substantially trapezoidal shape which is formed by cutting off the vertex of a triangle.

In the aforementioned illuminating device 110, each protrusion 132 can be formed into a truncated rectangular pyramid having an oblong bottom surface, not a truncated square pyramid. In this case, the optical path conversion characteristic for the XZ plane can be made different from that for the YZ plane.

The present invention has been described with reference to embodiments. It should be noted, however, that the present invention is not restricted to the aforementioned embodiment. For example, various types of light source capable of surface emitting such as an inorganic electroluminescent element and LED element can be incorporated in place of the organic electroluminescent element 20 can be incorporated into the aforementioned illuminating devices 10 and 110.

Further, the material of the prism sheet 130 is not limited to the resin such as PMMA. For example, it is possible to use the materials of polymethyl methacrylate (refractive index n=1.49), Arton (n=1.51, registered trade mark), Zeonoa (n=1.52, registered trade mark), glass (n=1.53), polyvinyl chloride (n=1.54), polyethylene terephthalate (n=1.57), polycarbonate (n=1.58) and polystyrene (n=1.59), as well as the materials made of the aforementioned materials provided with coating.

The prismatic protrusions 32 and 132 preferably have a pitch 2H of 50 μm through 200 μm. If the pitch 2H is greater than the above range, accurate formation of protrusions by a mold will be enabled. If the pitch 2H is less than the range, the overall thickness of the prism sheet, hence the thickness of the illuminating device, will be decreased.

What is claimed is:

1. An optical element comprising:
an incident surface on the optical element; and
an emitting section formed on an opposite side of the optical element to the incident surface and comprising a plurality of protrusions,
wherein when each of the plurality of protrusions is projected onto a reference plane perpendicular to the incident surface to form a reference contour, the reference contour being substantially a trapezoid,
wherein when each of the plurality of protrusions is projected onto an orthogonal plane perpendicular to the incident surface and the reference plane to form an orthogonal contour, the orthogonal contour is substantially a trapezoid,
the optical element satisfies $1 \leq (h2-h1)/h2 \times 100 \leq 35$, where h1 is a height of the reference contour, and h2 is a height of a triangle formed by extending two legs of the reference contour, and
wherein each of the plurality of protrusions comprises:
a horizontal surface, and
a plurality of slopes formed on respective laterals of the each of the plurality of protrusions and facing each other so that the each of the plurality of protrusions tapers in a direction away from and perpendicular to the incident surface and toward the horizontal surface.

2. The optical element of claim 1, wherein the reference contour is substantially an isosceles trapezoid.

3. The optical element of claim 1, wherein each of the plurality of protrusions is a truncated rectangular pyramid.

4. The optical element of claim 3, wherein each of the plurality of protrusions is a truncated square pyramid.

5. The optical element of claim 1, wherein the horizontal surface transmits a light flux entering substantially perpendicularly into the incident surface, and
the plurality of slopes reflects a light flux entering substantially perpendicularly into the incident surface.

6. The optical element of claim 1, satisfying $33 < \beta/\sqrt{n} < 39$ wherein $\beta(°)$ is an angle between a base and a leg of the reference contour, and
n is a refractive index of the emitting section.

7. The optical element of claim 1, comprising polymethylmethacrylate, and
satisfying $40.3° < \beta < 47.6°$,
where $\beta(°)$ is an angle between a base and a leg of the reference contour.

8. The optical element of claim 1, wherein the emitting section has a shape in which the plurality of protrusions are continuously arranged by adjoining each other.

9. The optical element of claim 1, wherein the optical element is arranged such that the incident surface faces a surface light emitting element comprising one of an organic electroluminescence element and an inorganic electroluminescence element and that the incident surface receives a light flux emitted from the surface light emitting element.

10. An illuminating device comprising:
a surface light emitting element comprising one of an organic electroluminescence element and an inorganic electroluminescence element;
an optical element arranged at a first side of the surface light emitting element; and
a reflection element arranged at a second side of the surface light emitting element opposite to the first side,
wherein the optical element comprises:
an incident surface on the optical element facing the first side of the surface light emitting element; and
an emitting section formed on an opposite side of the optical element to the incident surface and comprising a plurality of protrusions,
wherein when each of the plurality of protrusions is projected onto a reference plane perpendicular to the incident surface to form a reference contour, the reference contour being substantially a trapezoid, and
the optical element satisfies $1 \leq (h2-h1)/h2 \times 100 \leq 35$, where h1 is a height of the reference contour, and h2 is a height of a triangle formed by extending two legs of the reference contour, and
wherein each of the plurality of protrusions comprises:
a horizontal surface, and
a plurality of slopes formed on respective laterals of the each of the plurality of protrusions and facing each other so that the each of the plurality of protrusions tapers in a direction away from and perpendicular to the incident surface and toward the horizontal surface.

11. The illuminating device of claim 10, wherein the surface light emitting element has a Lambertian light distribution property.

12. The illuminating device of claim 10, wherein when each of the plurality of protrusions is projected onto an orthogonal plane perpendicular to the incident surface and the reference plane to form a orthogonal contour, the orthogonal contour is substantially a trapezoid.

13. An optical element comprising:
an incident surface on the optical element; and
an emitting section formed on an opposite side of the optical element to the incident surface and comprising a plurality of protrusions,
wherein when each of the plurality of protrusions is projected onto a reference plane perpendicular to the incident surface to form a reference contour, the reference contour is substantially a trapezoid, and
the optical element satisfies $1 \leq (h2-h1)/h2 \times 100 \leq 35$, where h1 is a height of the reference contour, and h2 is a height of a triangle formed by extending two legs of the reference contour, and
wherein each of the plurality of protrusions comprises:
a horizontal surface for emitting a light flux, and
a plurality of slopes formed on respective laterals of the each of the plurality of protrusions and facing each other so that the each of the plurality of protrusions tapers in a direction away from and perpendicular to the incident surface and toward the horizontal surface.

* * * * *